July 2, 1963   W. W. McLEOD, JR   3,096,515
ANTENNA SYSTEMS
Filed Aug. 29, 1958
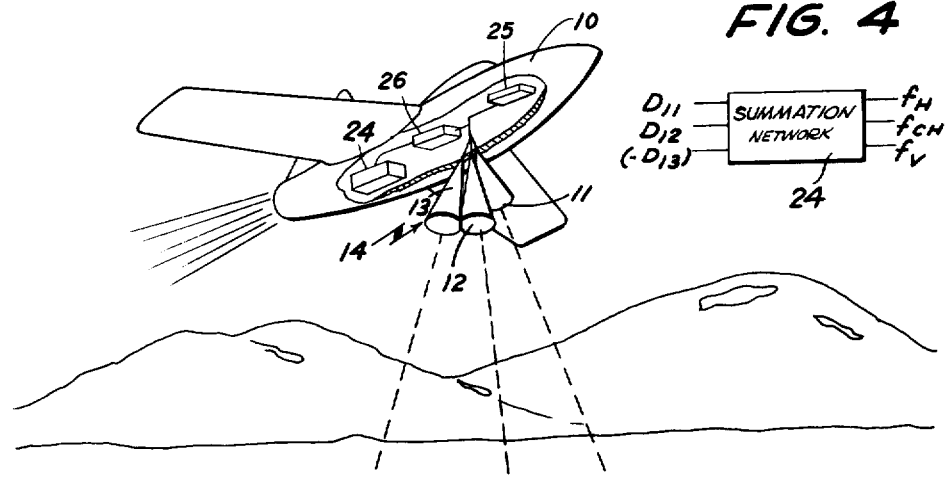
FIG. 4
FIG. 1
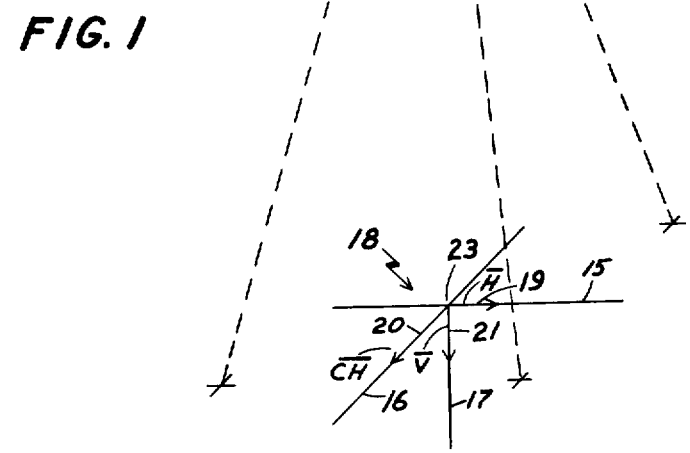
FIG. 2
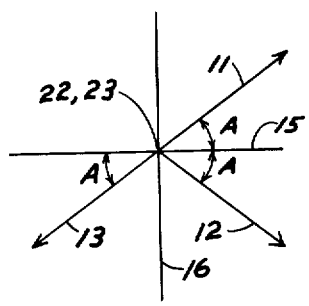
FIG. 3
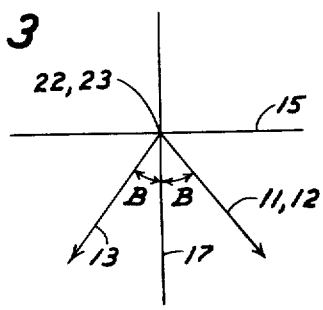
INVENTOR
WILLARD W. McLEOD, JR.
BY
ATTORNEY United States Patent Office 3,096,515
Patented July 2, 1963

3,096,515
ANTENNA SYSTEMS
Willard W. McLeod, Jr., Lexington, Mass., assignor to Raytheon Company, Lexington, Mass., a corporation of Delaware
Filed Aug. 29, 1958, Ser. No. 758,051
7 Claims. (Cl. 343—9)

This invention relates generally to antenna systems and more particularly to systems utilizing three antennas for Doppler navigation.

Conventional Doppler navigation systems have usually required a relatively large amount of associated electronic equipment. Normally, in order to get the required Doppler signals to control an aircraft or to measure its motion, for instance, relatively complicated computers have to be used. This invention provides a simplified antenna system for use in Doppler navigators. The simplifications involved make it possible to reduce the size and weight of associated electronic equipment to a large extent.

In Doppler navigation it is desirable to obtain signals proportional to the velocity of a moving aircraft with reference to a particular coordinate system. For example, if we select a coordinate system having orthogonal coordinates along the directions of the aircraft heading velocity vector, cross-heading velocity vector and vertical velocity vector, it is necessary to provide three signals $f_H$, $f_{CH}$ and $f_V$ frequencies proportional to these velocities, respectively. In conventional systems, it has been required that the Doppler signals obtained at each of the antennas be multiplied by appropriate trigonometric functions which are defined by the angular relationships existing between the individual antenna positions and the reference coordinates. This invention, however, eliminates the necessity for providing an elaborate computer to perform these trigonometric computations. The computations involved are simplified considerably by mounting the antennas of the invention so that unique predetermined angular relationships exist between each of the antenna positions and the reference coordinates.

For example, in one embodiment of the invention, a first antenna is mounted within the aircraft so that its beam is pointed forward along one side of the positive heading velocity vector and in a downward direction along the positive vertical velocity vector. The first antenna beam thereby subtends a first predetermined angle with respect to the positive heading velocity vector and a second predetermined angle with respect to the positive vertical velocity vector. A second antenna is mounted so that its beam is pointed forward along the opposite side of the positive heading velocity vector and also in a downward direction along the positive vertical velocity vector. The second antenna beam is thereby arranged to subtend an angle with respect to the positive heading velocity vector and an angle with respect to the vertical velocity vector, the magnitudes of which are equal to those subtended by the first antenna beam. A third antenna is mounted so that its beam is pointed to the rear along the negative heading velocity vector and in a downward direction along the positive vertical velocity vector. The third antenna beam is thereby arranged to subtend an angle with respect to the negative heading velocity vector and an angle with respect to the positive vertical velocity vector, the magnitudes of which are also equal to those subtended by the first antenna beam. By this choice of antenna orientation, all of the trigonometric functions of the antennas are identical with the exception of their signs. The Doppler return signals thereby can be directly combined to provide the required control signals without the need of any complicated equipment to provide trigonometric computations.

The invention may be best described with the help of the drawing in which:

FIGURE 1 shows a pictorial representation of one embodiment of the invention;

FIGURE 2 represents a top view of the vector orientation of the antennas of the embodiment of the invention shown in FIGURE 1 with respect to a reference coordinate system;

FIGURE 3 represents a side view of the vector orientation of the antennas of the embodiment of the invention shown in FIGURE 1 with respect to the reference coordinate system; and FIGURE 4 represents a block diagram of a summation network used to combine the antenna Doppler signals for producing signals proportional to the velocity of the aircraft shown in FIGURE 1.

In FIGURE 1 there is shown an aircraft 10 within the underside of which is mounted an antenna system 14. A summation network 24 is electrically connected to antenna system 14. As shown in FIGURE 4, summation network 24 receives three Doppler signals, $D_{11}$, $D_{12}$, and $(-D_{13})$ and combines them in such a way as to produce three signals, $f_H$, $f_{CH}$, and $f_V$, the frequencies of which are proportional to the aircraft heading velocity, cross-heading velocity, and vertical velocity, respectively. The manner in which the three Doppler signals are combined is explained below with reference to Equations 1–6 which follow. To clarify the description of the invention, aircraft 10 is shown in level flight substantially parallel to the ground and the size of the antenna configuration is exaggerated with respect to the size of aircraft 10.

To explain the operation of the invention, it is necessary to define a reference coordinate system such as that represented by coordinate system 18, made up of coordinates 15, 16, and 17. Coordinate 15 lies along a direction parallel to the heading velocity vector 19 of the aircraft. The heading velocity vector is designated as $\overline{H}$. The positive heading velocity vector is defined as being substantially in the forward direction of the nose of the aircraft. Coordinate 16 lies along the direction of the aircraft's cross-heading velocity vector 20 which is defined as being perpendicular to the direction of the heading velocity vector. The cross-heading velocity vector is designated as $\overline{CH}$. The positive cross-heading velocity vector is defined as being in a direction along the right wing of the aircraft and perpendicular to the heading velocity vector. Coordinate 17 lies along a direction parallel to the vertical velocity vector 21 of the aircraft. The vertical velocity vector is designated as $\overline{V}$. The positive vertical velocity vector is defined as being in a downward direction and is perpendicular to both the heading velocity vector and the cross-heading velocity vector. Reference coordinate system 18 is thereby defined as a left-handed orthogonal system as shown in FIGURE 1. It is understood that origin 23 of coordinate system 18 in FIGURE 1 could be placed coincident with origin 22 of antenna system 14. However, for the sake of clarity, it has been placed in this particular figure at a point removed from the aircraft. Nonetheless, as understood in the art, the angular relationships herein discussed still validly apply.

Antenna system 14 is made up of three antennas which are designated as 11, 12, and 13, and which, in accordance with the invention, are arranged in a predetermined angular relationship with the coordinates 15, 16, and 17 of coordinate system 18. In order to explain the predetermined angular relationship that is required, it is helpful to use the vector diagrams of FIGURES 2 and 3.

In FIGURES 2 and 3, origin 22 of antenna system 14 is represented as being coincident with origin 23 of coordinate system 18 in order to show more clearly the angular relationships involved. FIGURE 2 shows a top view of the antenna system looking down in the positive direction along vertical coordinate 17. Antenna 11 is arranged so that its beam subtends an angle having a magnitude A with the positive direction of coordinate 15. Antenna 12 is situated on the opposite side of coordinate 15 and is arranged so that its beam subtends an angle having an equal magnitude A with the positive direction of coordinate 15. Antenna 13 is arranged so that its beam subtends an angle having an equal magnitude A with the negative direction of coordinate 15.

FIGURE 3 shows a side view of antenna system 14 looking down in a negative direction along cross-heading coordinate 16 of reference coordinate system 18. In FIGURE 3 it can be seen that antennas 11 and 12 are situated on one side of coordinate 17 and are arranged so that their beams subtend equal angles, each having a magnitude B with the positive direction of coordinate 17. Antenna 13 is situated on the other side of coordinate 17 and subtends an angle B with the positive direction of coordinate 17. It can be seen, therefore, from FIGURES 2 and 3 that antennas 11, 12, and 13 each subtend angles which are substantially equal in magnitude with respect to particular coordinates 15, 16, or 17. Because the angles A and B have been so chosen, the angles subtended by the antenna beams with the cross-heading coordinate are also uniquely determined. By this choice of antenna orientation, the co-sines of these angles are all identical with the exception of their signs.

It is well known that the equations for the Doppler frequencies observed at antennas 11, 12, and 13 can be written:

a. $$D_{11} = K_{11}f_H - K_{12}f_{CH} - K_{13}f_V \quad (1)$$
b. $$D_{12} = K_{11}f_H + K_{12}f_{CH} - K_{13}f_V \quad (2)$$
c. $$(-D_{13}) = +K_{11}f_H - K_{12}f_{CH} + K_{13}f_V \quad (3)$$

where: $D_{11}$, $D_{12}$ and $(-D_{13})$ are the Doppler frequencies as observed at antennas 11, 12, and 13, respectively; $f_H$, $f_{CH}$, $f_V$ are frequencies proportional to heading, cross-heading and vertical velocities, respectively; and $K_{11}$, $K_{12}$ and $K_{13}$ are the absolute values of the co-sines of the angles between the antennas and the appropriately associated coordinates of coordinate system 18. For example, $K_{11}$ is equal to the absolute value of cosine A, where A is the angle that each antenna subtends with respect to direction of the aircraft heading vector. The notations $K_{12}$ and $K_{13}$ refer similarly to the cross-heading and vertical velocity vectors, respectively.

The Doppler frequency $(-D_{13})$ derived from antenna 13 is considered a negative quantity with respect to the frequencies $D_{11}$ and $D_{12}$ for analytical purposes. In actual practice, however, the Doppler frequency appears as a real positive frequency. Therefore, in order to indicate the nature of the operations being performed by antenna 13, the notation $(-D_{13})$ has been used.

Mathematically, in order to obtain the frequencies, $f_H$, $f_{CH}$, $f_V$, it is merely necessary to add or subtract appropriate combinations of Equations 1, 2, or 3 and solve for the desired frequency. For example, in order to obtain $f_H$, Equation 2 is added to Equation 3 and the resulting equation is solved for the quantity $f_H$ to give the following equation:

$$f_H = \frac{D_{12} + (-D_{13})}{2K_{11}} \quad (4)$$

In order to obtain the frequency $f_{CH}$, Equation 1 is subtracted from Equation 2 and the resulting equation is solved for $f_{CH}$ to provide the following equation:

$$f_{CH} = \frac{D_{12} - D_{11}}{2K_{12}} \quad (5)$$

In order to obtain the frequency $f_V$, Equation 1 is subtracted from Equation 3 and the resulting equation is solved for $f_V$ to provide the following equation:

$$f_V = \frac{(-D_{13}) - D_{11}}{2K_{13}} \quad (6)$$

Thus, it can be seen from Equations 4, 5, and 6 that, in order to obtain signals whose frequencies are proportional to the heading velocity, cross-heading velocity, and vertical velocity, it is only necessary to add or subtract the Doppler signals from the appropriate antennas and to multiply by an appropriate constant according to Equations 4, 5, and 6. None of the operations involves any multiplication by variable trigonometric functions because the predetermined angles between the antenna beams and the reference coordinates are constant and determine the three constants, $K_{11}$, $K_{12}$, and $K_{13}$.

The antenna system of the invention shown in the drawing and described herein does not necessarily represent the only embodiment of the invention. For example, the antenna system need not be used only in aircraft operation but is suitable for use where a motion must be measured for any type of moving body. The antenna system need not be mounted directly to the frame of the moving body but instead may be mounted on some type of stabilized platform. The signals derived at the antennas that are proportional to the velocity of the particular body may be translated into any other coordinate system by means of suitable resolvers, as is known in the art. Therefore, the invention is not to be construed as limited to the particular embodiment described herein except as defined by the appended claims.

What is claimed is:

1. A navigation system comprising, in combination, a transmitter; an antenna system connected to said transmitter for radiating signals from said transmitter; means for receiving return echo signals from said antenna system, said antenna system including at least three antennas, each of said antennas subtending a first predetermined angle with respect to one of a plurality of reference coordinates, and each of said antennas subtending a second predetermined angle with respect to another of said reference coordinates, said first predetermined angles being substantially equal in magnitude and said second predetermined angles being substantially equal in magnitude; and means for combining said antenna signals.

2. A Doppler navigation system comprising, in combination, a moving body; a transmitter; an antenna system connected to said transmitter for radiating signals from said transmitter and for receiving return signals, said antenna system including a plurality of antennas attached to said moving body for producing a plurality of Doppler return signals, each of said antennas subtending a first predetermined angle with respect to one of a plurality of orthogonal reference coordinates, and each of said antennas subtending a second predetermined angle with respect to another of said reference coordinates, said first predetermined angles being substantially equal in magnitude, and said second predetermined angles being substantially equal in magnitude; means connected to said antenna system for receiving said Doppler return signals; and means for combining said Doppler signals from said receiving means to produce a plurality of navigation signals having frequencies proportional to the velocity of said body.

3. An antenna system comprising, in combination, a transmitter; at least three antennas connected to said transmitter for radiating signals from said transmitter, each of said antennas subtending a first predetermined angle with respect to one of a plurality of orthogonal reference coordinates, and each of said antennas subtending a second predetermined angle with respect to another of said reference coordinates, said first predetermined angles being substantially equal in magnitude and said second predetermined angles being substantially equal in magnitude.

4. An antenna system comprising, in combination, a moving body; a transmitter; at least three antennas connected to said transmitter for radiating signals from said transmitter, each of said antennas subtending a first predetermined angle with respect to one of a plurality of orthogonal reference coordinates and each of said antennas subtending a second predetermined angle with another of said reference coordinates, said first predetermined angles being substantially equal in magnitude, and said second predetermined angles being substantially equal in magnitude; and means connected to said antennas for deriving signals proportional to the velocity of said body.

5. An antenna system comprising, in combination, a moving body; a transmitter; a plurality of antennas connected to said transmitter for radiating signals from said transmitter, each of said antennas subtending a first predetermined angle with respect to one of a plurality of orthogonal reference coordinates and each of said antennas subtending a second predetermined angle with another of said reference coordinates, said first predetermined angles being substantially equal in magnitude, and said second predetermined angles being substantially equal in magnitude; and means connected to said antennas for deriving signals proportional to the heading velocity, cross-heading velocity, and the vertical velocity of said body.

6. An antenna system comprising, in combination, a moving body; a transmitter; three antennas connected to said transmitter for radiating signals from said transmitter, each of said antennas subtending a first predetermined angle with respect to a first coordinate of a reference set of coordinates, said first coordinate lying along the direction of the heading velocity of said moving body, each of said antennas subtending a second predetermined angle with respect to a said second coordinate lying along the direction of the cross-heading velocity of said body, said first predetermined angles being substantially equal in magnitude, and said second predetermined angles being substantially equal in magnitude; and means for deriving signals proportional to the heading velocity, the cross-heading velocity and the vertical velocity of said body.

7. An antenna system comprising, in combination, an aircraft; a transmitter; first, second, and third antennas mounted within said aircraft and connected to said transmitter for radiating signals from said transmitter; said first antenna subtending a first predetermined angle with a first coordinate of a reference set of three orthogonal coordinates, a second predetermined angle with a second coordinate of said reference set, and a third predetermined angle with a third coordinate of said reference set; said second antenna subtending a fourth predetermined angle with said first coordinate, a fifth predetermined angle with said second coordinate, and a sixth predetermined angle with said third coordinate, said fourth predetermined angle being substantially equal in magnitude to said first predetermined angle, said fifth predetermined angle being substantially equal in magnitude to said second predetermined angle, and said sixth predetermined angle being substantially equal in magnitude to said third predetermined angle; said third antenna subtending a seventh predetermined angle with said first coordinate, an eighth predetermined angle with said second coordinate, and a ninth predetermined angle with said third coordinate, said seventh predetermined angle being substantially equal in magnitude to said first predetermined angle, said eighth predetermined angle being substantially equal in magnitude to said second predetermined angle, and said ninth predetermined angle being substantially equal in magnitude to said third predetermined angle and means connected to said antennas for deriving signals proportional to the velocity of said aircraft.

References Cited in the file of this patent
UNITED STATES PATENTS

| | | |
|---|---|---|
| 1,864,638 | Chilowsky | June 28, 1932 |
| 2,403,625 | Wolff | July 9, 1946 |
| 2,422,064 | Anderson | June 10, 1947 |
| 2,425,303 | Carter | Aug. 12, 1947 |
| 2,834,014 | Thorne | May 6, 1958 |
| 2,857,590 | Berger | Oct. 21, 1958 |
| 2,866,190 | Berger | Dec. 23, 1958 |
| 2,923,000 | Wolinsky | Jan. 26, 1960 |
| 2,981,944 | Washburne | Apr. 25, 1961 |